US009749115B2

United States Patent
Panchal et al.

(10) Patent No.: US 9,749,115 B2
(45) Date of Patent: Aug. 29, 2017

(54) INTERFERENCE CANCELLATION ON SECONDARY CARRIERS IN A CARRIER AGGREGATION ENVIRONMENT

(71) Applicant: Verizon Patent and Licensing Inc., Arlington, VA (US)

(72) Inventors: Jignesh S. Panchal, Hillsborough, NJ (US); Rakshit Trivedi, Parsippany, NJ (US); Frank Jager, Chester, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 100 days.

(21) Appl. No.: 14/954,689

(22) Filed: Nov. 30, 2015

(65) Prior Publication Data

US 2017/0155492 A1 Jun. 1, 2017

(51) Int. Cl.
*H04L 5/00* (2006.01)
*H04W 72/08* (2009.01)
*H04W 72/04* (2009.01)

(52) U.S. Cl.
CPC .......... *H04L 5/0073* (2013.01); *H04L 5/0048* (2013.01); *H04W 72/048* (2013.01); *H04W 72/0453* (2013.01); *H04W 72/082* (2013.01)

(58) Field of Classification Search
CPC combination set(s) only.
See application file for complete search history.

(56) References Cited

U.S. PATENT DOCUMENTS

| 2014/0228051 | A1* | 8/2014 | Siomina | G01S 5/0205 455/456.1 |
| 2015/0124691 | A1* | 5/2015 | Li | H04L 5/005 370/312 |
| 2015/0172035 | A1* | 6/2015 | Xu | H04L 5/0073 370/329 |
| 2016/0119936 | A1* | 4/2016 | Kim | H04J 11/0053 370/329 |

* cited by examiner

*Primary Examiner* — Frank Duong

(57) ABSTRACT

Techniques described herein may allow for information, regarding neighboring cells, to be used in interference cancellation techniques in a carrier aggregation environment. A serving base station (or cell) may provide information, regarding neighboring cells that operate at a primary component carrier and one or more secondary component carriers, to a user device that employs carrier aggregation. The user device may use the information, regarding the neighboring cells, to filter interference, caused by the neighboring cells, at the primary component carrier and the secondary component carrier(s).

20 Claims, 5 Drawing Sheets

INTERFERENCE CANCELLATION ON SECONDARY CARRIERS IN A CARRIER AGGREGATION ENVIRONMENT

BACKGROUND

Wireless telecommunications systems have been experiencing a rapid growth rate in mobile data demand. Mobile system operators typically alleviate this growth through network densification. However, network densification may also lead to an increase of radio link interference on both uplink and downlink radio interfaces. Traditional air interface optimization mitigation techniques can reduce interference somewhat, but such techniques have practical limits in their effectiveness.

One example feature to mitigate downlink interference is called Cell-specific Reference Signal-Interference Cancellation ("CRS-IC"). CRS-IC uses existing network configuration information to inform user devices (e.g., wireless telephones) about the type of CRS patterns used by the device's potential interferers (e.g., neighboring cells that operate at the same frequency as the user device). In accordance with CRS-IC, the user device may use this information to process the interfering cell signal patterns to offset the interfering signal, and thus to mitigate the interference (also referred as "interference cancellation").

DETAILED DESCRIPTION OF PREFERRED EMBODIMENTS

The following detailed description refers to the accompanying drawings. The same reference numbers in different drawings may identify the same or similar elements.

Systems and/or methods, described herein, may allow for the use of interference cancellation techniques in wireless networks that utilize carrier aggregation. Carrier aggregation is a technique whereby a user device (e.g., a wireless telephone) communicates with a wireless network (e.g., with a base station of a wireless network) over multiple carriers. As used herein, a "carrier" may refer to a particular frequency band, or a discrete portion of a particular frequency band.

Specifically, for instance, while some techniques allow for the use of interference cancellation when a user device operates at a single carrier, expanding interference cancellation techniques to allow for interference cancellation on multiple carriers may provide several benefits. These benefits include, among potentially others, the benefit of allowing the increased robustness and throughput of carrier aggregation, while further enhancing a user device's connectivity by eliminating interference on some or all of the carriers used in the carrier aggregation.

Figure 1:
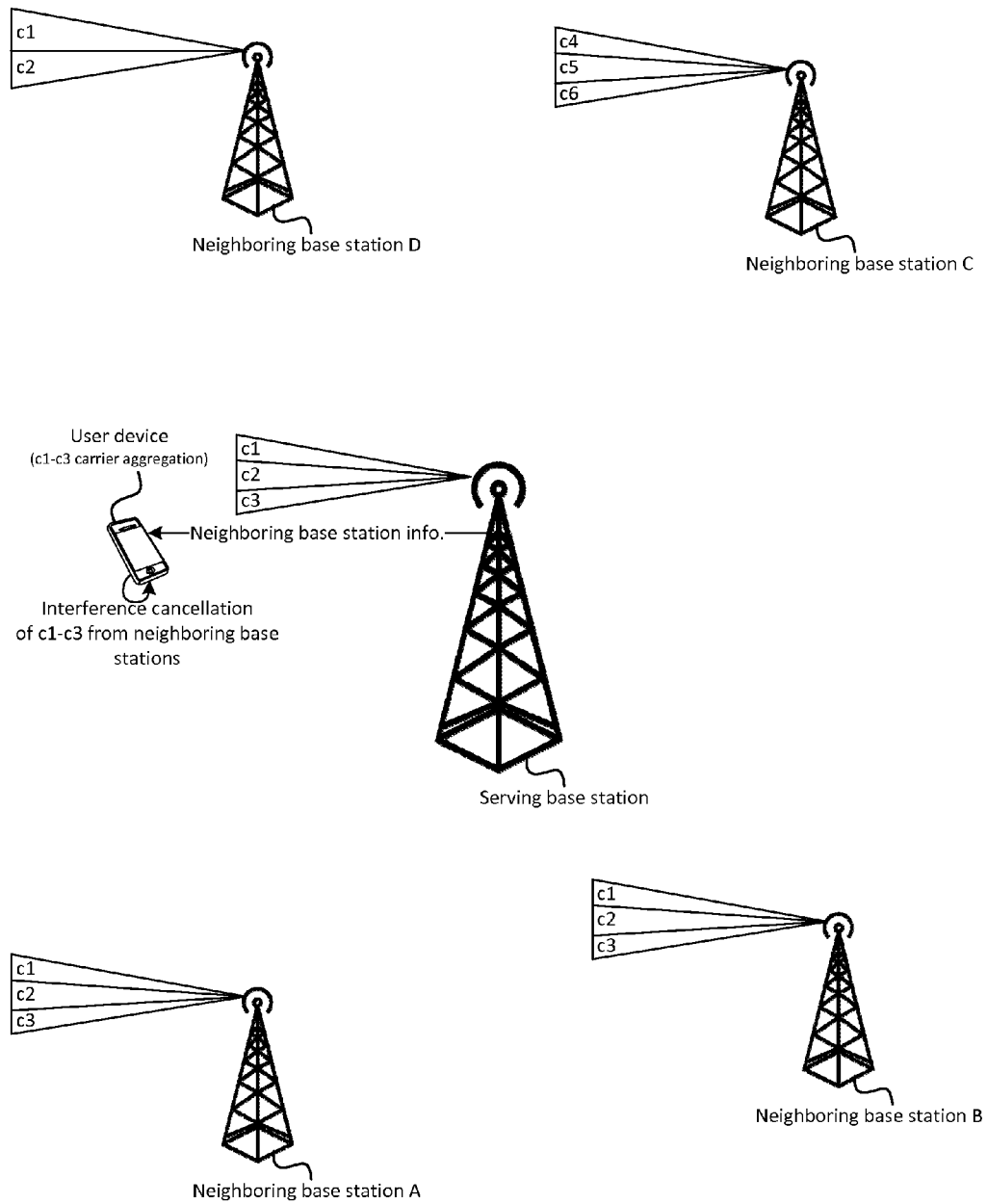
FIG. 1 illustrates an example overview of one or more implementations described herein.

FIG. 1 illustrates an example overview of one or more implementations described herein. As shown, a user device may be attached to a particular base station of a wireless telecommunications network (shown in the figure as "Serving base station"). The serving base station may operate using a number of different carriers (shown as "c1," "c2," and "c3"). The user device may utilize carrier aggregation, and may, thus, utilize all three carriers (i.e., c1, c2, and c3) when communicating with the serving base station.

As also shown, a number of neighboring base stations (i.e., "Neighboring base station A," "Neighboring base station B," "Neighboring base station C," and "Neighboring base station D") may be present. The neighboring base stations may be "neighbors" in the sense that they are within particular physical proximity to the serving base station and/or to the user device. To this end, signals from the neighboring base stations may be "visible" to the user device, and may potentially cause interference to the user device. For example, neighboring base stations A and B operate at c1-c3, and neighboring base station D operates at c1 and c2. Thus, signals from base stations A, B, and D may interfere with the operation of the user device.

In accordance with some implementations, the serving base station may provide information, to the user device, regarding one or more neighboring base stations, which may interfere with the operation of the user device. For instance, referring to the example shown in FIG. 1, the serving base station may provide information, to the user device, regarding neighboring base stations A, B, and D. The user device may use one or more interference cancellation techniques (e.g., CRS, CRS-IC and/or another technique), in order to "clean" the signals received from the serving base station (e.g., to filter out the interference from neighboring base stations A, B, and D at c1-c3).

Figure 2:
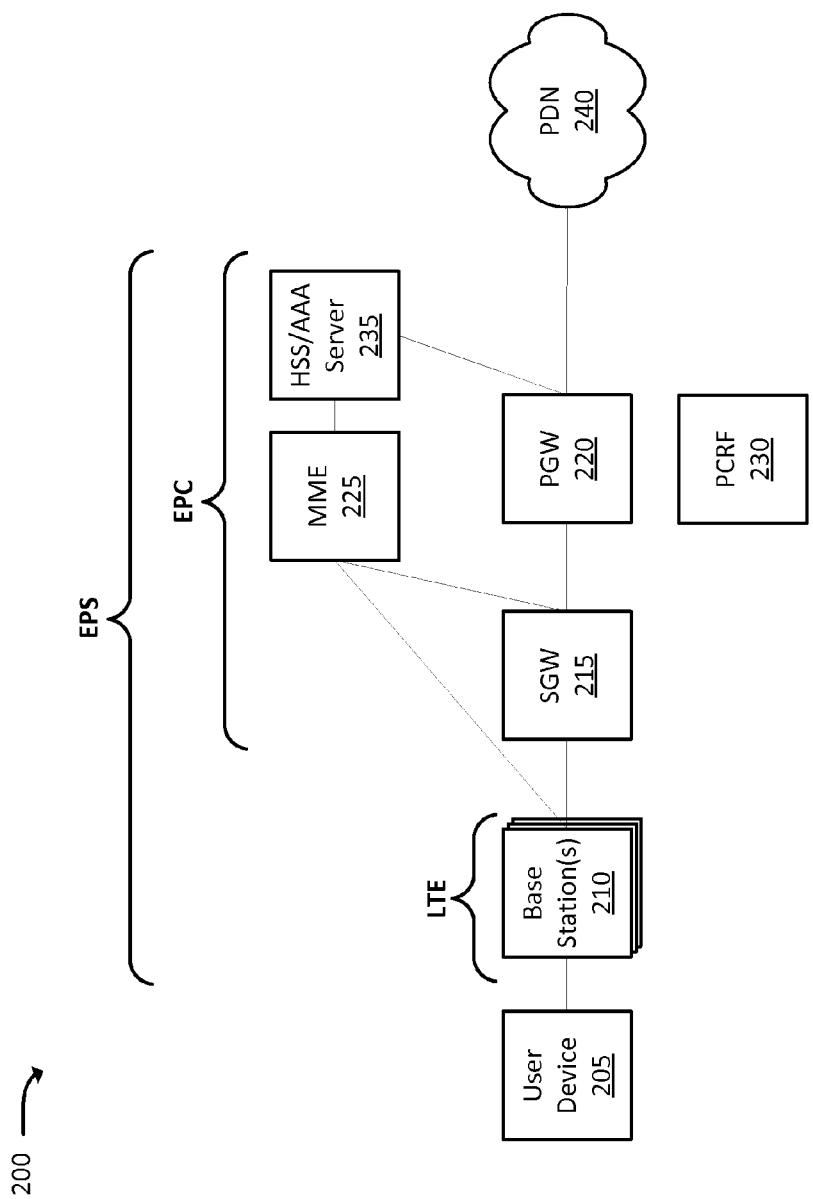
FIG. 2 illustrates an example environment, in which systems and/or methods, described herein, may be implemented.

FIG. 2 illustrates example environment 200, in which systems and/or methods described herein may be implemented. As shown in FIG. 2, environment 200 may include user device 205, one or more base stations 210, serving gateway ("SGW") 215, packet data network ("PDN") gateway ("PGW") 220, mobility management entity device ("MME") 225, policy and charging rules function ("PCRF") 230, home subscriber server ("HSS")/authentication, authorization, accounting ("AAA") server 235 (hereinafter referred to as "HSS/AAA server 235"), and PDN 240. While "direct" connections are shown in FIG. 2 between certain devices, some devices may communicate with each other via one or more intermediary devices (e.g., routers, switch, hubs, etc.) or networks (e.g., an Ethernet backhaul network ("EBH") and/or some other type of network). Furthermore, some of the connections shown in FIG. 2 may be logical connections, and may represent the communication between different logical portions of a single device.

Environment 200 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a radio access network ("RAN") that includes one or more base stations 210, some or all of which may take the form of an evolved node B ("eNB"), via which user device 205 may communicate with the EPC network. The EPC network may include one or more SGWs 215, PGWs 220, and/or MMEs 225, and may enable user device 205 to communicate with PDN 240 and/or an Internet protocol ("IP") multimedia subsystem ("IMS") core network. The IMS core network may include and/or communicate with HSS/AAA server 235, and may manage authentication, session initiation, account information, a user profile, etc., associated with user device 205.

User device 205 may include a computation and communication device, such as a wireless mobile communication device that is capable of communicating with base station 210, femtocell 215, and/or PDN 240. For example, user device 205 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 205 may send traffic to and/or receive traffic from PDN 240 via base station 210, SGW 215, and/or PGW 220. User device 205 may send and/or receive traffic, to and/or from base station 210, over multiple carriers, using carrier aggregation. User device 205 may also, in accordance with some implementations, be capable of using CRS-IC, and/or some other technique, in order to perform interference cancellation on interference from one or more base stations 210, to which user device 205 is not attached.

Base station 210 may include one or more network devices that receive, process, and/or transmit traffic, such as calls, audio, video, text, and/or other data, destined for and/or received from user device 205. In one example, base station 210 may be an eNB device and may be part of the LTE network. Base station 210 may receive traffic from and/or send traffic to user device 205 via SGW 215, PGW 220, and/or PDN 240. Base station 210 may send traffic to and/or receive traffic from user device 205 via, for example, an air interface (e.g., a cellular air interface).

SGW 215 may include one or more network devices that gather, process, search, store, and/or provide information in a manner described herein. SGW 215 may, for example, aggregate traffic received from one or more base stations 210, and may send the aggregated traffic to PDN 240 via PGW 220.

PGW 220 may include one or more network devices that gather, process, search, store, and/or provide information in a manner described herein. PGW 220 may aggregate traffic received from one or more SGWs 215, etc. and may send the aggregated traffic to PDN 240 (e.g., via traffic optimizer(s) 240). PGW 220 may also, or alternatively, receive traffic from PDN 240 and may send the traffic toward user device 205 via base station 210 and/or SGW 215.

MME 225 may include one or more computation and communication devices that perform operations to register user device 205 with the EPS, to establish bearer channels associated with a session with user device 205, to hand off user device 205 from the EPS to another network, to hand off user device 205 from the other network to the EPS, and/or to perform other operations. MME 225 may perform policing operations on traffic destined for and/or received from user device 205.

PCRF 230 may include one or more devices that aggregate information to and from the EPC network and/or other sources. PCRF 230 may receive information regarding policies and/or subscriptions from one or more sources, such as subscriber databases and/or from one or more users (such as, for example, an administrator associated with PCRF 230).

HSS/AAA server 235 may include one or more devices that manage, update, and/or store, in a memory associated with HSS/AAA server 235, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber (e.g., a subscriber associated with user device 205); information regarding services to which particular subscribers are subscribed (e.g., communication services, such as video conferencing services, voice chat services, etc.); and/or other information. Additionally, or alternatively, HSS/AAA server 235 may perform authentication, authorization, and/or accounting operations associated with the subscriber and/or a communication session with user device 205.

PDN 240 may include one or more wired and/or wireless networks. For example, PDN 240 may include an IP-based PDN, a wide area network ("WAN") such as the Internet, a core network of a telecommunications provider, a private enterprise network, and/or one or more other networks. User device 205 may connect, through PGW 220, to data servers, application servers, other user devices 205, and/or to other servers or applications that are coupled to PDN 240. PDN 240 may be connected to one or more other networks, such as a public switched telephone network ("PSTN"), a public land mobile network ("PLMN"), and/or another network. PDN 240 may be connected to one or more devices, such as content providers, applications, web servers, and/or other devices, with which user device 205 may communicate.

Figure 3:
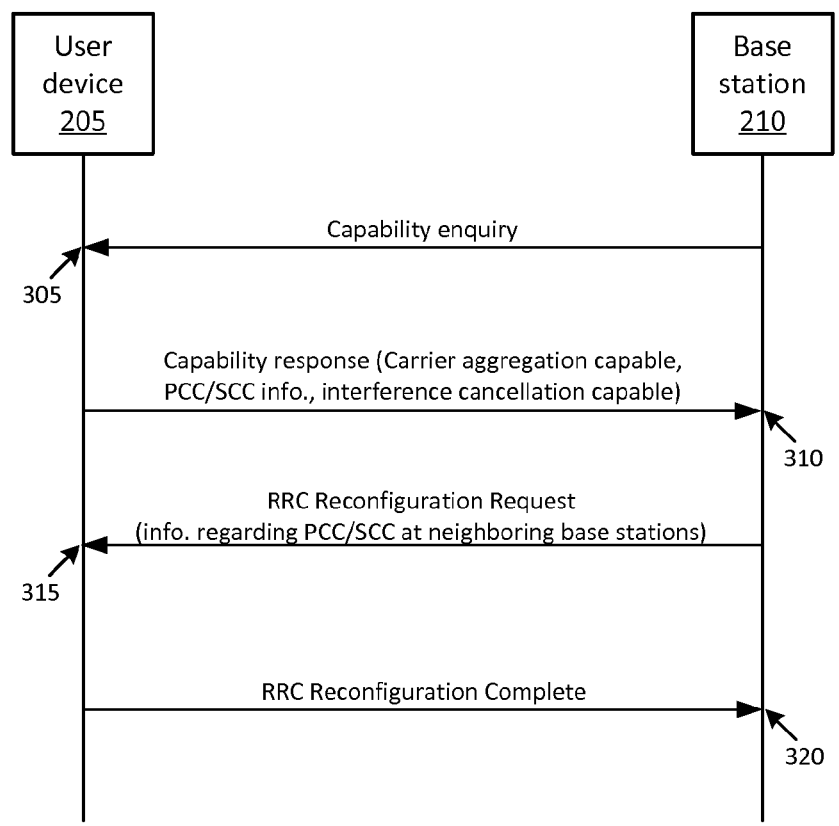
FIG. 3 illustrates an example signal flow for performing a network-assisted interference cancellation technique for a user device that utilizes carrier aggregation.

FIG. 3 illustrates an example signal flow for performing a network-assisted interference cancellation technique for a user device that utilizes carrier aggregation, in accordance with some implementations. For example, as shown, base station 210 may output (at 305) a capability enquiry message to user device 205. The capability enquiry message may be outputted as part of an attachment procedure, and/or at some other time.

In this example, assume that user device 205 is capable of utilizing carrier aggregation, and also that user device 205 is capable of performing interference cancellation. User device 205 may provide (at 310) a capability response to base station 210, indicating the capabilities of user device 205, which may include, as stated above, carrier aggregation and interference cancellation. While carrier aggregation and interference cancellation are discussed herein as examples, in practice, user device 205 may indicate several other capabilities.

Base station 210 may output (at 315) information regarding a primary carrier and one or more secondary carriers to user device 205. For example, as part of the attachment procedure, base station 210 may select multiple carriers, via which to communicate with user device 205, using carrier aggregation. The multiple carriers may include a primary component carrier ("PCC") and one or more secondary component carriers ("SCCs"). In some implementations, base station 210 may provide the information, identifying the PCC and the SCC, via a radio resource control ("RRC") reconfiguration message.

The RRC reconfiguration message may also include information regarding one or more neighboring base stations 210 that are associated with (e.g., operate at) the selected PCC and SCC(s). An example structure of a portion of the RRC reconfiguration message, that includes the information regarding the neighboring base stations 210, is as follows:

```
neighCellsCRS-Info-r11
{
  CRS-AssistanceInfo-r11:
  {
    physCellId-r11 X,
    antennaPortsCount-r11...,
    mbsfn-SubframeConfigList-r11
  }
  {
    physCellId-r11 Y,
    antennaPortsCount-r11...,
    mbsfn-SubframeConfigList-r11
  }
}
neighSCellsCRS-Info-r11
{
  SCell-CRS-AssistanceInfo-r11:
  {
    physSCellId-r11 P,
    antennaPortsCount-r11...,
    mbsfn-SubframeConfigList-r11
  }
  {
    physSCellId-r11 Q,
    antennaPortsCount-r11...,
    mbsfn-SubframeConfigList-r11
  }
}
```

In the above example, "neighCellsCRS-Info-r11" may denote an information element that includes information, regarding neighboring cells (e.g., base stations 210 that may be within communication range of user device 205). The "CRS-AssistanceInfo-r11" information element may include information, regarding the neighboring cells, that may be used by user device 205 to perform interference cancellation (i.e., CRS, in this example), in order to cancel interference on a PCC associated with user device 205. A "cell," as referred to herein, may refer to a particular base station 210, and/or a grouping of one or more antennas of a particular base station 210.

The first example information element within CRS-AssistanceInfo-r11 may include information regarding a particular base station 210 (or cell) having an identifier represented here as X (as denoted by the line, "physCellId-r11 X"). Other information regarding cell X may be included, such as a quantity of antenna ports ("antennaPortsCount-r11 . . . "), evolved Multimedia Broadcast Messaging Service ("eMBMS")-related information ("mbsfn-SubframeConfigList-r11"), and/or other types of information.

The next example information element, within CRS-AssistanceInfo-r11, may include information regarding another base station 210 (or cell) having an identifier represented here as Y (as denoted by the line, "physCellId-r11 Y"). As with the base station 210 denoted as X, the information element for base station Y may include antenna port information, eMBMS-related information, and/or other types of information.

In addition to the information element "neighCellsCRS-Info-r11," the RRC reconfiguration message may include an information element, "neighSCellsCRS-Info-r11," which may include information regarding neighboring cells that are operating on one or more of the SCC(s) assigned to user device 205 by base station 210. For example, the "neighCellsCRS-Info-r11" information element may include an "SCell-CRS-AssistanceInfo-r11" information element, which may include information regarding the neighboring cells, that may be used by user device 205 to perform interference cancellation (i.e., CRS in this example), in order to cancel interference on an SCC associated with user device 205. The example information shown above, regarding the neighboring cells operating at the SCC(s), may include information regarding cells with an identifier represented by P and Q (i.e., "physSCellId-r11 P" and "physSCellId-r11 Q," in this example).

Once user device 205 receives the RRC reconfiguration message, user device 205 may use the information, included in the message, to configure carrier aggregation using the specified PCC and the SCC(s). User device 205 may also use the information, included in the RRC reconfiguration message, to configure interference cancellation on the PCC and the SCC(s). Once user device 205 has performed the configuration of carrier aggregation and interference cancellation (as well as performing any other configurations specified in the RRC reconfiguration message), user device 205 may output (at 320) an RRC reconfiguration complete message to base station 210, indicating that the configuration is complete.

Figure 4:
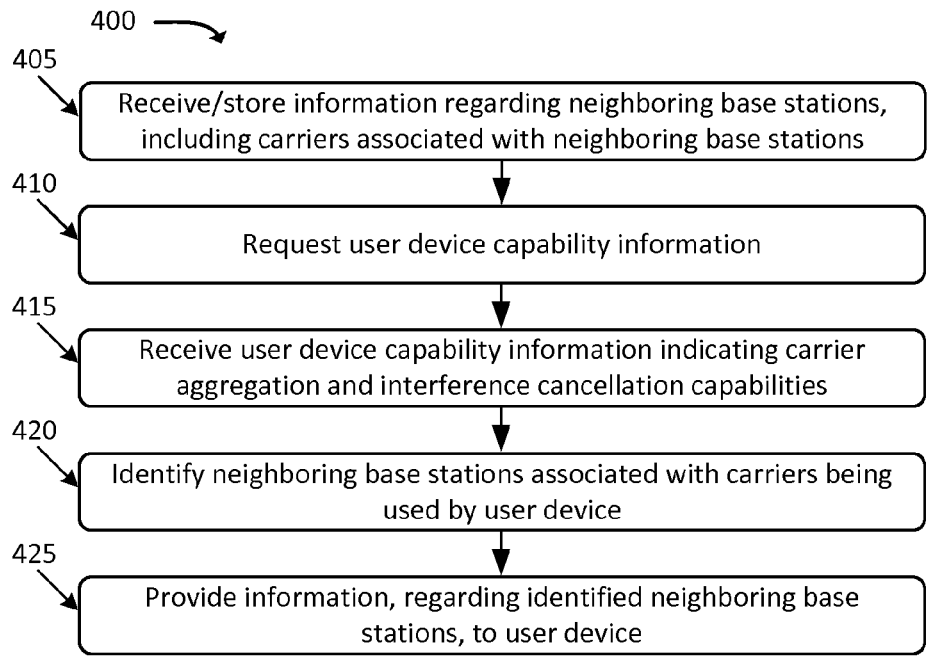
FIGS. 4 and 5 illustrate example processes for performing a network-assisted interference cancellation technique for a user device that utilizes carrier aggregation.
Figure 5:
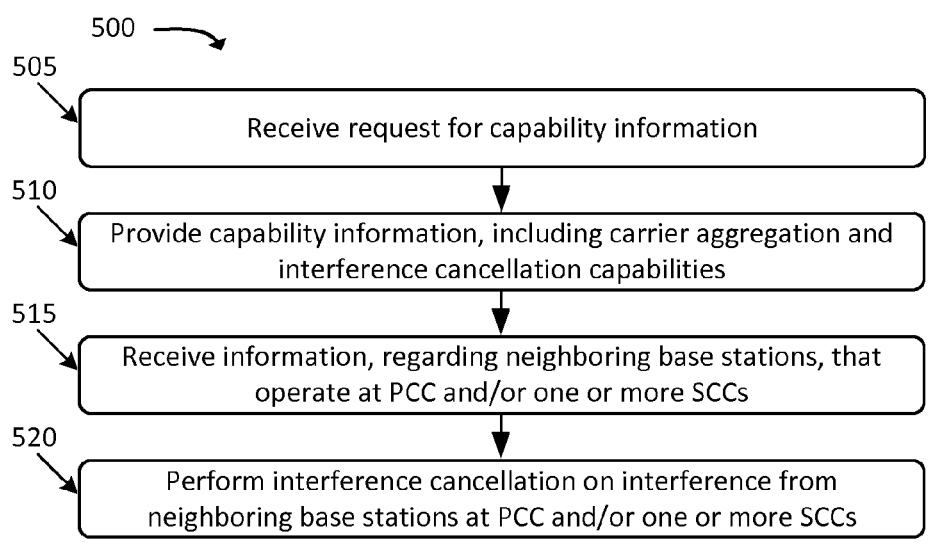

FIGS. 4 and 5 illustrate example processes 400 and 500, respectively, for performing a network-assisted interference cancellation technique for a user device that utilizes carrier aggregation. In some implementations, process 400 may be performed by base station 210, and process 500 may performed by user device 205. In other implementations, some or all of processes 400 and/or 500 may be performed by one or more other devices.

As shown in FIG. 4, process 400 may include receiving and/or storing (at 405) information regarding neighboring base stations, including carriers associated with the neighboring base stations. For example, in accordance with known techniques, and/or other techniques, base station 210 may receive information regarding neighboring base stations or cells (e.g., cells that are within a particular distance of base station 210). The received information may indicate carriers (e.g., frequency bands, or portions of frequency bands) at which the neighboring cells operate. In accordance with some implementations, the received information may include other information, such as transmit power of antennas, of the neighboring cells, associated with particular carriers.

Process 400 may also include requesting (at 410) user device capability information. For example, upon initial attachment of user device 205, handover of user device 205 to base station 210, and/or some other reconfiguration event, base station 210 may output a Capability Enquiry message (and/or some other type of message) to user device 205.

Process 400 may further include receiving (at 415) the requested user device capability information, which may indicate carrier aggregation and interference cancellation capabilities. Base station 210 may select, based on the information indicating that user device 205 is capable of performing carrier aggregation techniques, multiple carriers to assign to user device 205. For instance, in accordance with some implementations, base station 210 may select a PCC and one or more SCCs, via which to send and/or receive traffic to user device 205.

Process 400 may additionally include identifying (at 420) neighboring base stations associated with carriers assigned to the user device. For example, user device 205 may identify one or more neighboring base stations (or cells) within a particular distance of user device 205, and/or within a particular distance of base station 210. In some implementations, base station 210 may adjust the determination of neighboring cells based on transmit powers associated with antennas of the neighboring cells. That is, for example, a cell with a relatively weak transmit power may not be identified as a "neighboring cell," even if the cell is near relatively close to base station 210, by virtue of the weak transmit power. The neighboring cells, identified by user device 205, may be cells that operate at the PCC and/or at the one or more SCCs. In this manner, cells that are relatively close to user device 205 and/or base station 210 may not be identified as "neighboring" cells, for the purposes of techniques described herein, if the cells are not operating at the same carriers as user device 205 is. Such cells may not need to be identified, as these cells may not generally be sources of interference for user device 205.

Process 400 may also include providing (at 425) information, regarding the identified neighboring base stations, to the user device. For example, as described above, base station 210 may provide the information, regarding the identified neighboring base stations (or cells) to user device 205 via an RRC reconfiguration message. User device 205 may use the information in order to perform carrier aggregation in conjunction with interference cancellation.

As shown in FIG. 5, process 500 may include receiving (at 505) a request for capability information. For instance, as part of an attachment process, a handover process, and/or some other reconfiguration process, user device 205 may receive a Capability Enquiry from a serving base station 210.

Process 500 may also include providing (at 510) the requested capability information, including an indication that the user device is capable of carrier aggregation and interference cancellation. For example, in response to the Capability Enquiry, user device 205 may notify base station 210 that user device 205 is capable of performing carrier aggregation, interference cancellation, etc.

Process 500 may further include receiving (at 515) information, regarding neighboring base stations, that operate at a particular PCC and/or one or more SCCs assigned to the user device. For example, as described above, user device 205 may receive an RRC reconfiguration request, indicating a PCC and one or more SCCs assigned to user device 205, as well as information regarding one or more neighboring base stations (or cells) that operate at the PCC and/or the SCC(s).

Process 500 may additionally include performing (at 520) interference cancellation on interference from the neighboring base stations operating at the PCC and/or the one or more SCCs. For instance, user device 205 may use the information, provided in the RRC reconfiguration request, to perform CRS, CRS-IC, and/or one or more other types of interference cancellation techniques, in order to filter out interference from the neighboring cells that operate at the PCC and/or an SCC.

Figure 6:
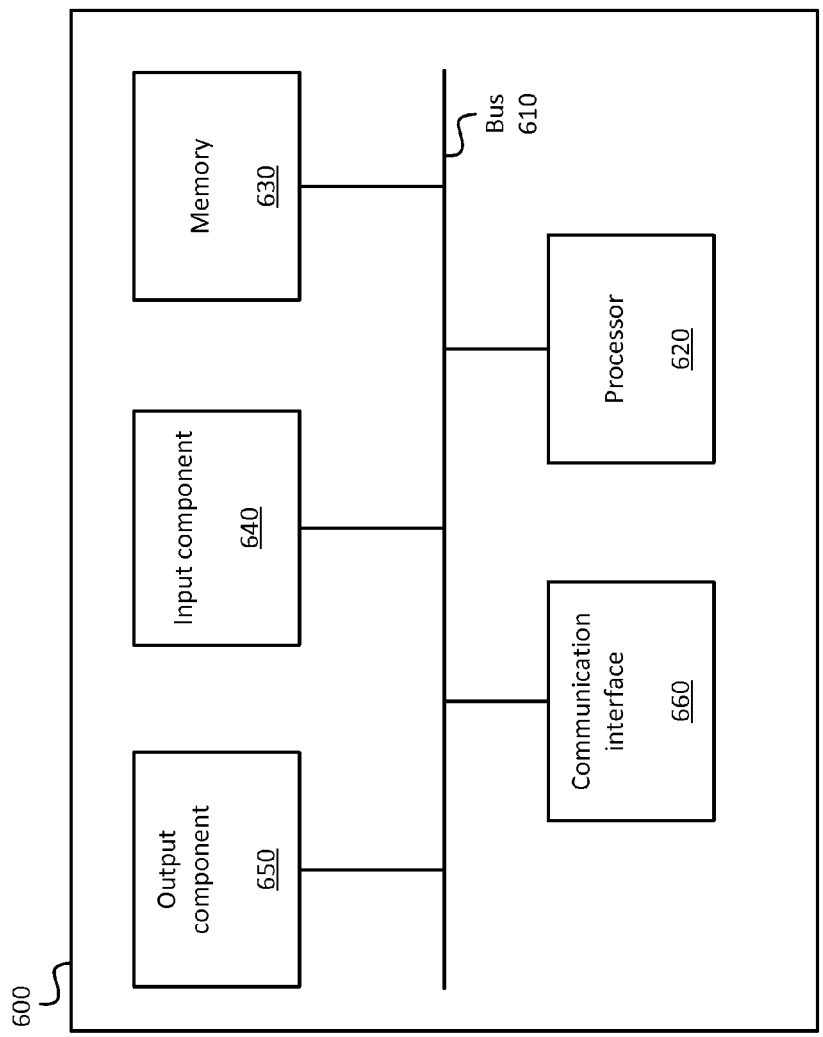
FIG. 6 illustrates example components of a device, in accordance with some implementations described herein.

FIG. 6 is a diagram of example components of device 600. One or more of the devices described above may include one or more devices 600. Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more light emitting diodes ("LEDs"), etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For instance, while some examples were described above in the context of one SCC or two SCCs, in practice, similar techniques may be used for any number of SCCs (e.g., three or above). As yet another example, while techniques were described above in the context of CRS or CRS-IC, in practice, any type of interference cancellation technique may be used.

As another example, while series of blocks have been described with regard to FIGS. 4 and 5, the order of the blocks and/or signals may be modified in other implementations. Further, non-dependent blocks and/or signals may be performed in parallel. Additionally, while FIGS. 4 and 5 have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) nay be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A base station of a wireless telecommunications network, configured to:
  receive, from a user device, capability information of the user device, the capability information indicating that the user device is capable of:
    carrier aggregation, and
    interference cancellation;
  assign, to the user device and based on the capability information indicating that the user device is capable of carrier aggregation:
    a primary component carrier ("PCC"), and
    at least one secondary component carrier ("SCC");
  identify, based on the capability information indicating that the user device is capable of interference cancellation, a first set of neighboring cells that operate using the PCC;
  identify, based on the capability information indicating that the user device is capable of interference cancellation, a second set of neighboring cells that operate using at least a particular one of the at least one SCC; and
  output, to the user device and in response to the capability information, information regarding the identified first and second sets of neighboring cells.

2. The base station of claim 1, wherein the at least one SCC includes two or more SCCs.

3. The base station of claim 1, wherein the information, regarding the identified first and second sets of neighboring cells, is used by the user device to filter interference, on the PCC and the at least one SCC, from the first and second sets of neighboring cells.

4. The base station of claim 1, wherein the base station is further configured to:
  output a Capability Enquiry message to the user device, wherein the capability information is received from the user device in response to the Capability Enquiry message.

5. The base station of claim 4, wherein the Capability Enquiry message is outputted to the user device as part of an attachment procedure, of the user device to the base station.

6. The base station of claim 1, wherein the information, regarding the identified first and second sets of neighboring cells, is provided to the user device via a Radio Resource Control reconfiguration message.

7. The base station of claim 1, wherein the interference cancellation, indicated in the capability information, includes Cell-specific Reference Signal ("CRS") interference cancellation.

8. The base station of claim 1, wherein the first and second neighboring cells are identified based on at least one of:
  geographical proximity to the base station, or
  geographical proximity to the user device.

9. A method, performed by a base station of a wireless telecommunications network, the method comprising:
  receiving, from a user device, capability information of the user device, the capability information indicating that the user device is capable of:
    carrier aggregation, and
    interference cancellation;
  assigning, to the user device and based on the capability information indicating that the user device is capable of carrier aggregation:
    a primary component carrier ("PCC"), and
    at least one secondary component carrier ("SCC");
  identifying, based on the capability information indicating that the user device is capable of interference cancellation, a first set of neighboring cells that operate using the PCC;
  identifying, based on the capability information indicating that the user device is capable of interference cancellation, a second set of neighboring cells that operate using at least a particular one of the at least one SCC; and outputting, to the user device and in response to the capability information, information regarding the identified first and second sets of neighboring cells.

10. The method of claim 9, wherein the at least one SCC includes two or more SCCs.

11. The method of claim 9, wherein the information, regarding the identified first and second sets of neighboring cells, is used by the user device to filter interference, on the PCC and the at least one SCC, from the first and second sets of neighboring cells.

12. The method of claim 9, further comprising:
outputting a Capability Enquiry message to the user device,
wherein the capability information is received from the user device in response to the Capability Enquiry message.

13. The method of claim 12, wherein the Capability Enquiry message is outputted to the user device as part of an attachment procedure, of the user device to the method.

14. The method of claim 9, wherein the information, regarding the identified first and second sets of neighboring cells, is provided to the user device via a Radio Resource Control reconfiguration message.

15. The method of claim 9, wherein the interference cancellation, indicated in the capability information, includes Cell-specific Reference Signal ("CRS") interference cancellation.

16. The method of claim 9, wherein the first and second neighboring cells are identified based on at least one of:
geographical proximity to the base station, or
geographical proximity to the user device.

17. A user device, configured to:
output, to a base station of a wireless telecommunications network, capability information, the capability information indicating that the user device is capable of:
carrier aggregation, and
interference cancellation;
receive, from the base station and in response to the capability information, information identifying a plurality of carriers, to communicate with the base station using carrier aggregation, the plurality of carriers including:
a primary component carrier ("PCC"), and
at least one secondary component carrier ("SCC");
receive, from the base station, information regarding:
a first set of neighboring cells that operate using the PCC, and
a second set of neighboring cells that operate using the at least one SCC; and
perform interference cancellation to filter interference, on the PCC and the at least one SCC, from the first and second sets of neighboring cells while communicating with the base station using carrier aggregation.

18. The user device of claim 17, wherein the at least one SCC includes two or more SCCs.

19. The user device of claim 17, wherein the user device is further configured to:
receive Capability Enquiry message from the base station,
wherein the capability information is outputted from the user device in response to the Capability Enquiry message.

20. The user device of claim 17, wherein performing the interference cancellation includes performing Cell-specific Reference Signal ("CRS") interference cancellation.

* * * * *